United States Patent
Meholic et al.

(10) Patent No.: US 6,484,492 B2
(45) Date of Patent: Nov. 26, 2002

(54) MAGNETOHYDRODYNAMIC FLOW CONTROL FOR PULSE DETONATION ENGINES

(75) Inventors: Gregory Vincent Meholic, Fairfield, OH (US); William Randolph Stowell, Rising Sun, IN (US)

(73) Assignee: General Electric Company, Schenectady, NY (US)

( * ) Notice: Subject to any disclaimer, the term of this patent is extended or adjusted under 35 U.S.C. 154(b) by 47 days.

(21) Appl. No.: 09/756,895

(22) Filed: Jan. 9, 2001

(65) Prior Publication Data

US 2002/0088219 A1 Jul. 11, 2002

(51) Int. Cl.$^7$ .............................. F02C 5/00; F02K 7/02
(52) U.S. Cl. ........................................ 60/247; 60/39.76
(58) Field of Search ............................. 60/39.76, 39.77, 60/39.78, 37.79, 39.8, 39.81, 247, 248, 249

(56) References Cited

U.S. PATENT DOCUMENTS

| | | | |
|---|---|---|---|
| 4,770,626 A | * 9/1988 | Zinn et al. | 431/1 |
| 5,473,885 A | * 12/1995 | Hunter et al. | 60/247 |
| 5,557,926 A | * 9/1996 | Hunter et al. | 60/247 |
| 5,579,633 A | 12/1996 | Hunter, Jr. et al. | |
| 2002/0059793 A1 | 5/2002 | Kaemming et al. | |

FOREIGN PATENT DOCUMENTS

| | | |
|---|---|---|
| GB | 638184 | 5/1950 |
| GB | 1111079 | 4/1968 |
| JP | 2002039012 | 2/2002 |

OTHER PUBLICATIONS

Ron J. Litchford, Energetic Combustion Devices for Aerospace Propulsion & Power, NASA JPL/MSFC 11$^{th}$ Advanced Space Propulsion Research Workshop, Jet Propulsion Laboratory, Pasadena, CA, May 31–Jun. 2, 2000, accessed Dec. 19, 2000 at http://apc2000.jpl.nasa.gov/proceedings/Chem_PR5.pdf.

Unmeel B. Mehta et al., Magnetohydrodynamic–Bypass Hypersonic Airbreathing Engine, NASA JPL/MSFC Eleventh Advanced Space Propulsion Research Workshop, Jet Propulsion Laboratory, Pasadena, CA, May 31–Jun. 2, 2000, accessed Dec. 19, 2000 at http://apc2000.jpl.nasa.gov/proceedings/Chem_PR6.pdf.

R.J. Litchford et al., Pulse Detonation MHD Experiments, 29$^{th}$ Plasmadynamics and Lasers Conference, Albuquerque, NM, Jun. 15–18, 1998, AIAA 98–2918.

R.J. Litchford et al., Towards Integrated Pulse Detonation Propulsion and MHD Power, 30$^{th}$ Plasmadynamics and Lasers Conference, Norfolk, VA, Jun. 28–Jul. 1, 1999, AIAA 99–3662.

A.L. Kuranov et al., The Potential of MHD Control for Improving Scramjet Performance, 30$^{th}$ Plasmadynamics and Lasers Conference, Norfolk, VA, Jun. 28–Jul. 1, 1999, AIAA 99–3535.

V.A. Bityurin et al., Thermodynamic Analysis of the AJAX Propulsion Concept (invited), 38$^{th}$ AIAA Aerospace Sciences Meeting, Reno, NV, Jan. 10–13, 2000, AIAA 2000–0445.

B. Burakhanov et al., Advancement of Scramjet MHD Concept, 38$^{th}$ AIAA Aerospace Sciences Meeting & Exhibit, Reno, NA, Jan. 10–13, 2000, AIAA 2000–0614.

F.K. Lu et al., Exploratory Study of Conductivity in Detonation Waves, 1999, AIAA 99–0868.

\* cited by examiner

*Primary Examiner*—Louis J. Casaregola
(74) *Attorney, Agent, or Firm*—Rodney M. Young; Pierce Atwood, Attorneys (57) ABSTRACT

Flow control in pulse detonation engines is accomplished using magnetohydrodynamic principles. The pulse detonation engine includes a tube having an open forward end and an open aft end and a fuel-air inlet formed in the tube at the forward end. An igniter is disposed in the tube at a location intermediate the forward end and the aft end. A magnetohydrodynamic flow control system is located between the igniter and the fuel-air inlet for controlling detonation in the tube forward of the igniter. The magnetohydrodynamic flow control system utilizes magnetic and electric fields forward of the igniter to dissipate or at least reduce the ignition potential of the forward traveling detonation flame front.

28 Claims, 6 Drawing Sheets

MAGNETOHYDRODYNAMIC FLOW CONTROL FOR PULSE DETONATION ENGINES

BACKGROUND OF THE INVENTION

This invention relates generally to pulse detonation engines and more particularly to pulse detonation engines utilizing magnetohydrodynamic flow control.

Most internal combustion engines currently used for propulsion rely on deflagration combustion whereby the combustion effects occur at relatively slow rates (i.e., less than the speed of sound within the combustible mixture) and at constant pressure. Detonation combustion, however, occurs at rates well in excess of the speed of sound and simultaneously provides a significant pressure rise. Because of the advantageous thermodynamic cycle, there is a high degree of interest in developing propulsive devices that rely on detonation combustion rather than deflagration combustion.

One such device is a pulse detonation engine that uses an intermittent combustion process to create a temperature and pressure rise by detonating a flammable mixture. The conditions for detonation are governed by the environment of the mixture (pressure, temperature, equivalence ratio, etc.) such that when enough energy is released to start ignition, the chemical kinetics occur at supersonic speeds. A pulse detonation engine is typically a tube of a specified length that is open at the aft end and includes some sort of valve device at the front end to keep the detonation process from traveling forward. In operation, a charge of air and fuel is fed into the tube through the valve, and the valve is then closed. Detonation of the fuel-air mixture is initiated by an igniter located in the tube, and the resulting detonation shock waves travel down the tube, raising both the temperature and the pressure of the products. The combustion products are expelled out of the open aft end, creating a pulse of forward thrust. When the shock waves have reflected within the tube to the appropriate conditions, a new charge is fed into the tube through the valve and the cycle repeats. It is generally desirable to generate pulses at a high frequency to produce smooth, nearly steady state propulsion.

Upon ignition, the resulting pressure waves and detonation flame front will tend to travel in both longitudinal directions. In current pulse detonation devices, however, ignition is initiated at the forward end of the tube so that the waves will generally travel downstream toward the open exhaust end. The valve is provided at the forward end of the tube to prevent pressure waves from escaping out the front of the device and, more importantly, to prohibit the detonation flame front from traveling into the fuel-air inlet system. The pulse detonation cycle requires that the valve operate at extremely high temperatures and pressures and must also operate at exceedingly high frequencies to produce smooth propulsion. These conditions significantly reduce the high cycle fatigue (HCF) reliability of conventional valve systems, such as poppet or flapper-type valves.

Accordingly, it would be desirable to have a high frequency valving or flow control system for pulse detonation engines that is lightweight, reliable, easily controlled and offers minimal performance loss.

BRIEF SUMMARY OF THE INVENTION

The above-mentioned need is met by the present invention, which provides a pulse detonation engine that includes a tube having an open forward end and an open aft end and a fuel-air inlet formed in the tube at the forward end. An igniter is disposed in the tube at a location intermediate the forward end and the aft end. A magnetohydrodynamic flow control system is located between the igniter and the fuel-air inlet for controlling detonation in the tube forward of the igniter. The magnetohydrodynamic flow control system creates a magnetic field forward of the igniter to dissipate the forward traveling detonation flame front.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
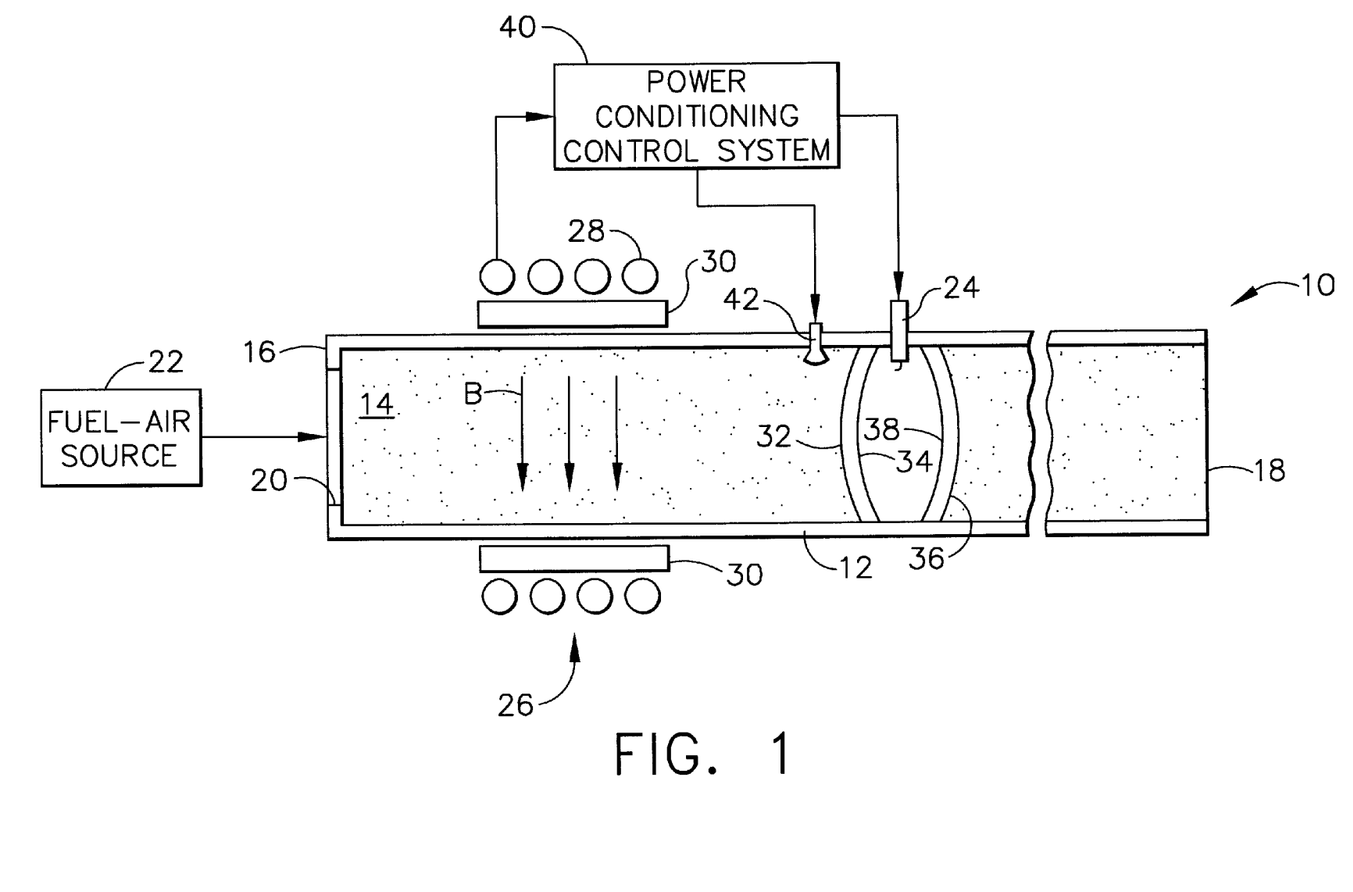
FIGS. 1 and 2 show a schematic cross-section of a pulse detonation engine having a first embodiment of a magnetohydrodynamic flow control system.
Figure 2:
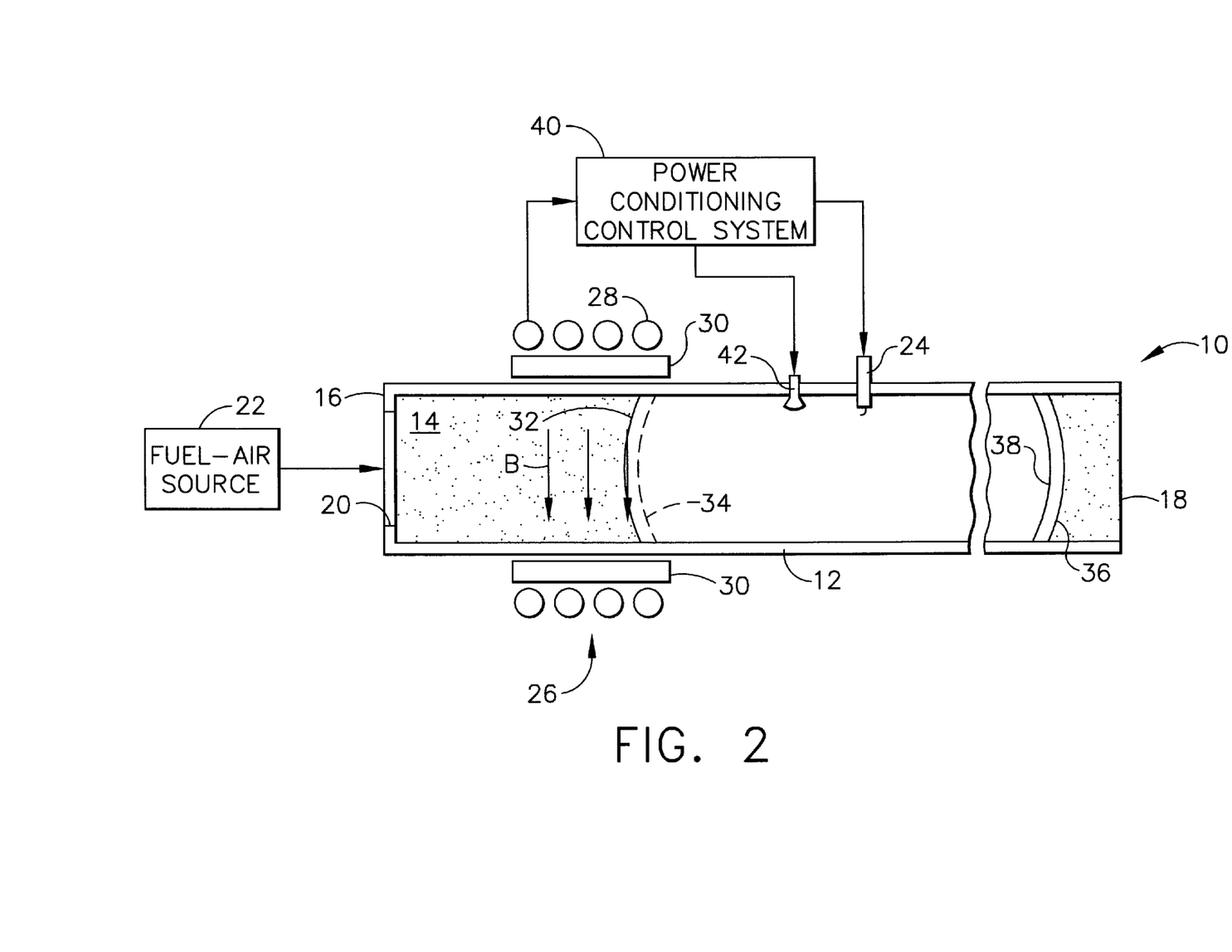

Referring to the drawings wherein identical reference numerals denote the same elements throughout the various views, FIGS. 1 and 2 show a first embodiment of a pulsed detonation engine 10 capable of generating forward thrust and useful in many propulsive applications such as a turbofan augmentor, a replacement for the high pressure turbomachinery of a conventional gas turbine engine, and a rocket engine. The pulse detonation engine 10 includes a tube 12 having a prescribed length and defining an internal combustion chamber 14. The tube 12 has an open forward end 16 and an open aft end 18. The open forward end 16 functions as a fuel-air inlet 20 to the tube 12, while the open aft end 18 provides an exhaust to the ambient. A fuel-air mixture from a source 22 enters the combustion chamber via the inlet 20. The source 22 can be any means of providing a mixture of fuel and air, many of which are known in the combustion art.

An igniter 24 is provided in the tube 12 at a location intermediate the forward and aft ends 16, 18, and preferably closer to the forward end 16 than the aft end 18. The igniter 24 produces sufficient energy to detonate the fuel-air mixture in the combustion chamber 14. The region of the combustion chamber 14 in the immediate vicinity of the igniter 24 is referred to herein as the detonation zone. Detonation combustion depends on the pressure, temperature and equivalence ratio of the fuel-air mixture, as well as the amount of energy released to start ignition. By locating the detonation zone closer to the forward end 16, a larger portion of the tube length is devoted to generating thrust. The overall length of the tube 12 will depend on the desired operating frequency of the pulse detonation engine 10.

A magnetohydrodynamic (MHD) flow control system 26 is located between the detonation zone and the fuel-air inlet 20 for controlling the detonation process in the forward portion of the tube 12. The MHD flow control system 26 comprises an electric field coil 28 wrapped around the exterior of the tube 12 at an axial location that is between the igniter 24 and the fuel-air inlet 20. A pair of magnets 30 are arranged in proximity to the electric field coil 28 and on opposite sides of the tube 12 so that a magnetic field is created in the tube 12 in a direction perpendicular to the longitudinal axis of the tube 12, as indicated by the arrows B. The magnets can be either permanent magnets or electromagnets. However, the use of permanent magnets would result in a passive system not requiring an additional energy input.

Upon detonation of the fuel-air mixture in the combustion chamber 14, detonation wave groups (pressure wave and flame front) will propagate in both the forward and aft directions. As depicted in FIGS. 1 and 2, the forward detonation wave group comprises a forward pressure wave 32 and a forward flame front 34. Likewise, the aft detonation wave group comprises an aft pressure wave 36 and an aft flame front 38. As a result of the combustion, the combustion products become weakly ionized and are thus electrically conductive. As the electrically conductive flow of the forward wave group 32, 34 passes perpendicularly through the magnetic field created by the magnets 30, an electrical current is generated in the electric field coil 28 by electromagnetic induction. The energy extracted from the forward wave group 32, 34 dissipates the forward flame front 34. Thus, the MHD flow control system 26 controls the forward detonation process, particularly prohibiting the forward flame front 34 from migrating to the fuel-air source 22, by extracting power to dissipate the forward wave group. The electric field coil 28 is accordingly designed such that an adequate amount of energy is extracted from the forward wave group 32, 34.

The electrical power generated by the electric field coil 28 can be used to charge the igniter 24. In this case, the electric field coil 28 is connected to a power conditioning control system 40 that is provided for directing the electrical power at the appropriate times to the igniter 24. In addition, the electricity could be used for other purposes, such as powering onboard devices in a vehicle being propelled by the pulse detonation engine 10.

The MHD flow control system 26 includes a supplemental ionization source 42 for boosting and/or maintaining the ionization of the post combustion products passing through the magnetic field. While the combustion process produces ionized combustion products, the charged particles tend to recombine quickly such that the combustion products lose their ionization. The ionization source 42 is thus provided to boost ionization and maintain the electron density of the combustion products passing through the magnetic field. Typically, an electron density of $10^{13}$ electrons per cubic centimeter is desired to achieve sufficient influence from the magnetic field. The ionization source 42 can be any device capable of supplementing ionization, such as an electron gun that bombards the combustion products with extra electrons or an RF generator that further heats the combustion products, thereby inhibiting recombination of charged particles. The ionization source 42 is preferably located at the aft end of the electric field coil 28, although it could also be located along the length of the coil 28. In addition, the inlet flow of the fuel-air mixture could be seeded with a catalyst to enhance ionization of the combustion products. Examples of suitable catalysts include potassium carbonate (powder) and cesium hydroxide (spray).

Operation of the pulse detonation engine 10 begins by filling the combustion chamber 14 with a charge of the fuel-air mixture introduced through the inlet 20. The igniter 24 is then activated to detonate the fuel-air mixture and generate the forward and aft detonation wave groups as shown in FIG. 1. The forward wave group 32, 34 travels forward in the tube 12 and is dissipated by the MHD flow control system 26 in the manner described above. The aft wave group 36, 38 travels downstream from the detonation zone through the generally longer aft portion of the tube 12, as shown in FIG. 2, consuming the fuel-air mixture along the way. As the aft pressure wave 36, which is a compression wave, accelerates through the combustion chamber 14, it raises both temperature and pressure. When the aft wave group 36, 38 reaches the aft end 18 of the tube 12, the hot, high pressure combustion products are expelled out of the open aft end, creating a pulse of forward thrust. The aft pressure wave 36 is then reflected at the aft end 18 as an expansion wave that propagates forward back through the tube 12. The expansion wave lowers pressure in the combustion chamber 14 and further evacuates the tube 12 so that a fresh charge of fuel-air mixture from the inlet 20 is drawn into the combustion chamber 14, thereby readying the pulse detonation engine 10 for the next cycle.

Figure 3:
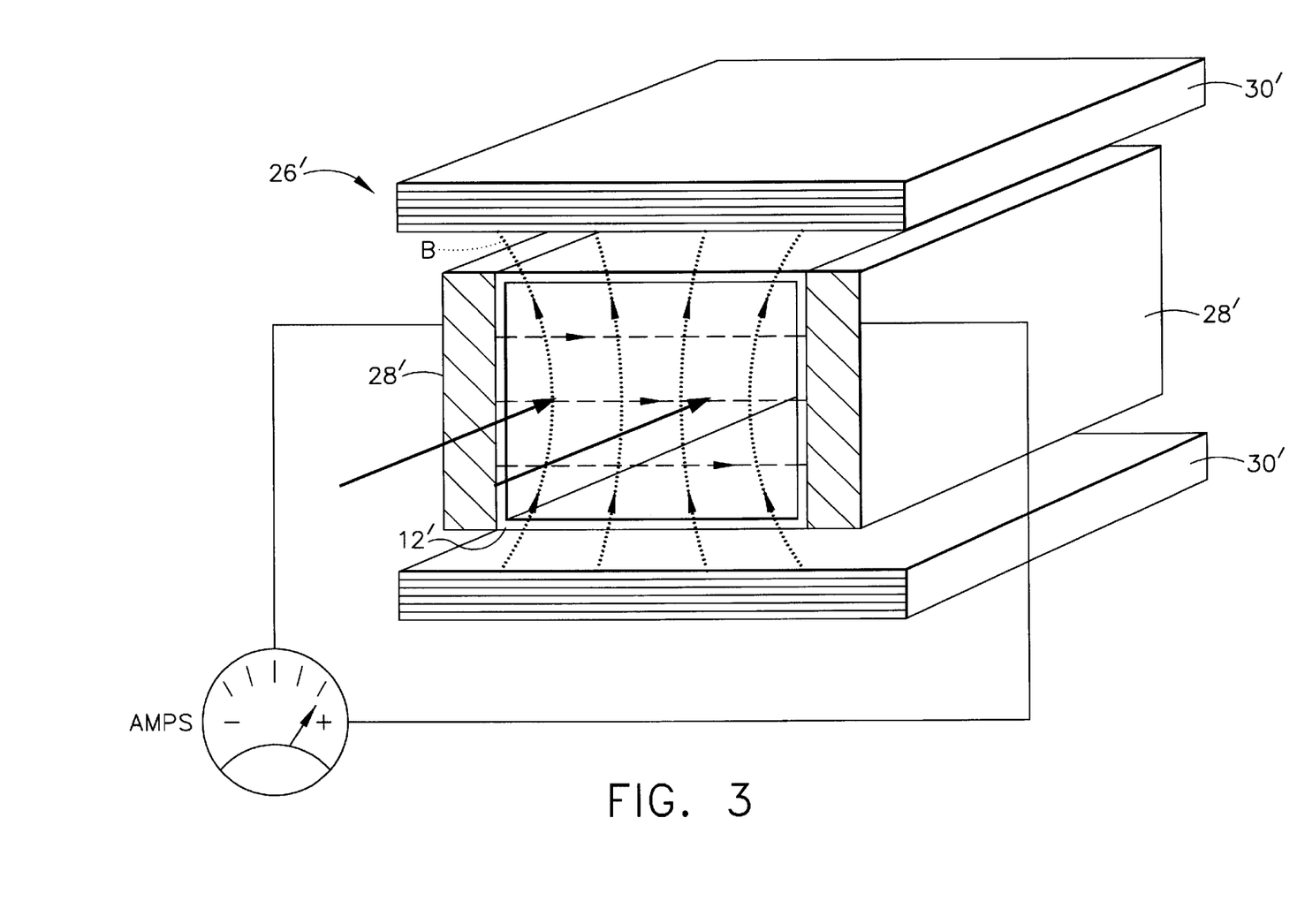
FIG. 3 is a perspective view showing an alternative configuration for the embodiment of FIGS. 1 and 2.

FIG. 3 shows an alternative configuration for the embodiment of FIGS. 1 and 2. In this arrangement, the electric field coil is replaced with a pair of electrodes. Specifically, the alternative MHD flow control system 26' is located between the detonation zone and the fuel-air inlet (not shown in FIG. 3) of the tube 12', which is substantially rectangular in cross-section. The MHD flow control system 26' comprises a pair of magnets 30' arranged on opposite sides of the tube 12' so that a magnetic field is created in the tube 12' in a direction perpendicular to the longitudinal axis of the tube 12', as indicated by the lines B. The magnets 30' can be either permanent magnets or electromagnets. A pair of electrodes 28' are located on opposite sides of the tube 12' and perpendicular to the magnets 30'. As before, detonation of the fuel-air mixture in the combustion chamber 14 will cause detonation wave groups to propagate in both the forward and aft directions. The ionized flow passing perpendicularly through the magnetic field created by the magnets 30' induces an electrical current between the electrodes 28'. The energy extracted to induce the electrical current dissipates the forward flame front. This arrangement ca n also be employed with a tube of axisymmetric cross-section as long as the ionized flow, magnetic field and the induced current flow perpendicular to one another.

Figure 4:
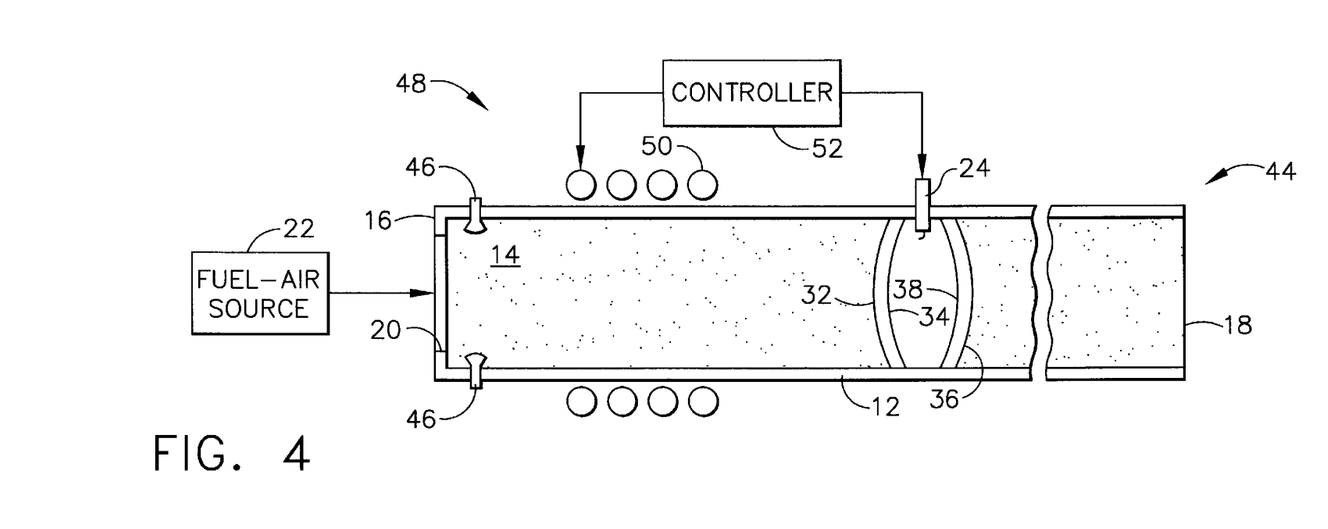
FIGS. 4 and 5 show a schematic cross-section of a pulse detonation engine having a second embodiment of a magnetohydrodynamic flow control system.
Figure 5:
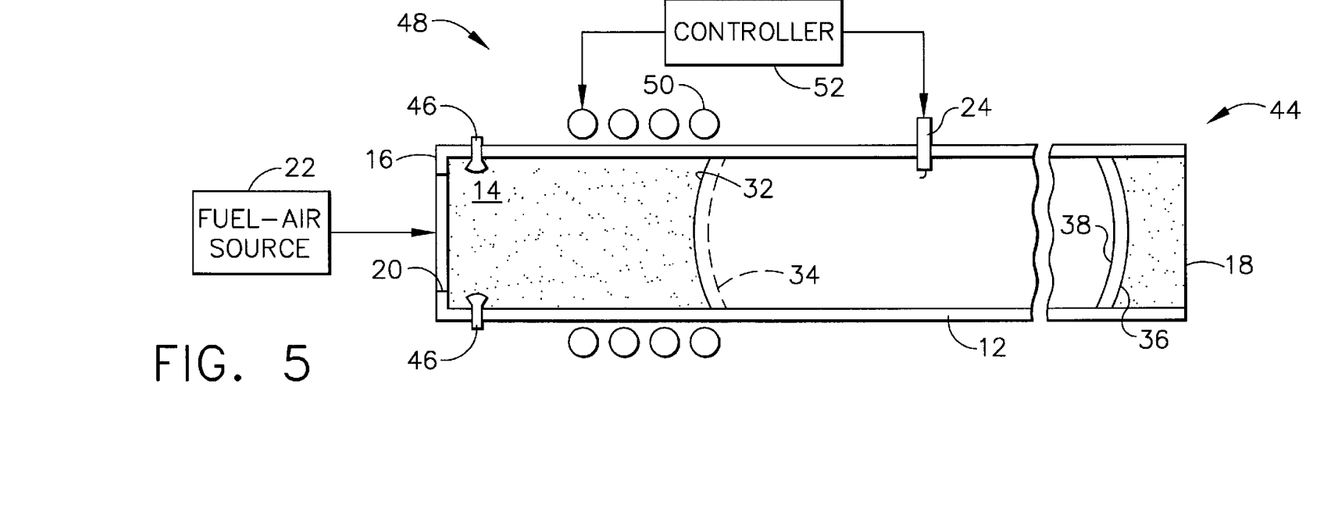

Referring now to FIGS. 4 and 5, a pulsed detonation engine 44 employing a second embodiment of MHD flow control is shown. The pulse detonation engine 44 includes a tube 12 having a prescribed length and defining an internal combustion chamber 14. The tube 12 has an open forward end 16 and an open aft end 18. The open forward end 16 functions as a fuel-air inlet 20 to the tube 12, while the open aft end 18 provides an exhaust to the ambient. A fuel-air mixture from a source 22 enters the combustion chamber via the inlet 20. One or more sources of ionization 46 are located in the inlet 20 so that just the fuel vapor of the fuel-air mixture becomes ionized upon entering the combustion chamber 14. Suitable sources of ionization include electrostatic grids across which a voltage potential is applied, fuel reactive, high electron density electrodes, and the like. As in the first embodiment, seeding the fuel-air mixture with a suitable catalyst can enhance ionization. Being sufficiently ionized, the fuel-air mixture within the combustion chamber 14 is affected by magnetic fields.

An igniter 24 is provided in the tube 12 at a location intermediate the forward and aft ends 16, 18, and preferably closer to the forward end 16 than the aft end 18. The igniter 24 produces sufficient energy to detonate the fuel-air mixture in the combustion chamber 14. The region of the combustion chamber 14 in the immediate vicinity of the igniter 24 is referred to herein as the detonation zone. Detonation combustion depends on the pressure, temperature and equivalence ratio of the fuel-air mixture, as well as the amount of energy released to start ignition. By locating the detonation zone closer to the forward end 16, a larger portion of the tube length is devoted to generating thrust. The overall length of the tube 12 will depend on the desired operating frequency of the pulse detonation engine 44.

An MHD flow control system 48 is located between the detonation zone and the fuel-air inlet 20 for controlling the detonation process in the forward portion of the tube 12. The MHD flow control system 48 comprises a magnetic field coil or coils 50 connected to a real time controller 52 capable of engaging an energy source (not shown) such that an electric current flows through the coil 50. The controller 52 also controls the igniter 24 and the ionization sources 46. The magnetic field coil 50 is wrapped around the exterior of the tube 12 at an axial location that is between the igniter 24 and the fuel-air inlet 20. Thus, when the controller 52 causes an electric current to flow though the coil 50, a magnetic field is created in the portion of the tube 12 enclosed by the coil 50. Due to the ionization of the fuel in the fuel-air mixture, the charged fuel particles would be directionally influenced by the magnetic field coil 50 when it becomes energized. Thus, activation of the magnetic field coil 50 would tend to separate the fuel-air mixture in the portion of the combustor chamber 14 encircled by the coil 50. As shown in FIGS. 4 and 5, this would result in a rich fuel zone in the center of the combustion chamber 14 surrounded by a lean air zone.

Operation of the pulse detonation engine 44 begins by filling the combustion chamber 14 with a charge of the fuel-air mixture introduced through the inlet 20. As mentioned above, the ionization sources 46 ionize the fuel-air mixture as it enters the combustion chamber 14. The magnetic field coil 50 is not activated while the combustion chamber 14 is being filled to ensure that the fuel-air mixture remains properly mixed throughout the combustion chamber 14. The controller 52 then activates the igniter 24 to detonate the fuel-air mixture. At the same time, the controller 52 also activates the magnetic field coil 50 causing the fuel-air mixture in the region of the combustion chamber 14 that is encircled by the coil 50 to become separated. Upon detonation of the fuel-air mixture, as shown in FIG. 4, forward and aft detonation wave groups will be generated. The forward detonation wave group comprises a forward pressure wave 32 and a forward flame front 34, and the aft detonation wave group comprises an aft pressure wave 36 and an aft flame front 38. The forward wave group 32, 34 travels forward in the tube 12 to the MHD flow control system 48. At this point, the forward flame front 34 encounters the separated fuel and air zones. The fuel and air separation starves the combustion process forward of the detonation zone, thereby dissipating the forward flame front 34 as it passes through the MHD flow control system 48, as shown in FIG. 5. Thus, the MHD flow control system 48 controls the forward detonation process by dissipating the forward flame front 34, thereby prohibiting it from migrating to the fuel-air source 22. Once the forward flame front 34 is dissipated, the coil 50 is deactivated.

Meanwhile, the aft wave group 36, 38 travels downstream from the detonation zone through the generally longer aft portion of the tube 12, consuming the fuel-air mixture along the way. As the aft pressure wave 36, which is a compression wave, accelerates through the combustion chamber 14, it raises both temperature and pressure. When the aft wave group 36, 38 reaches the aft end 18 of the tube 12, the hot, high pressure combustion products are expelled out of the open aft end, creating a pulse of forward thrust. The aft pressure wave 36 is reflected at the aft end 18 as an expansion wave that propagates forward back through the tube 12. The expansion wave lowers pressure in the combustion chamber 14 so that a fresh charge of fuel-air mixture from the inlet 20 is drawn into the combustion chamber 14, thereby readying the pulse detonation engine 44 for the next cycle. The controller 52 is set up to fire the igniter 24 and activate the magnetic field coil 50 at the desired frequency, which is coordinated with the timing of the pressure wave reflections.

Figure 6:
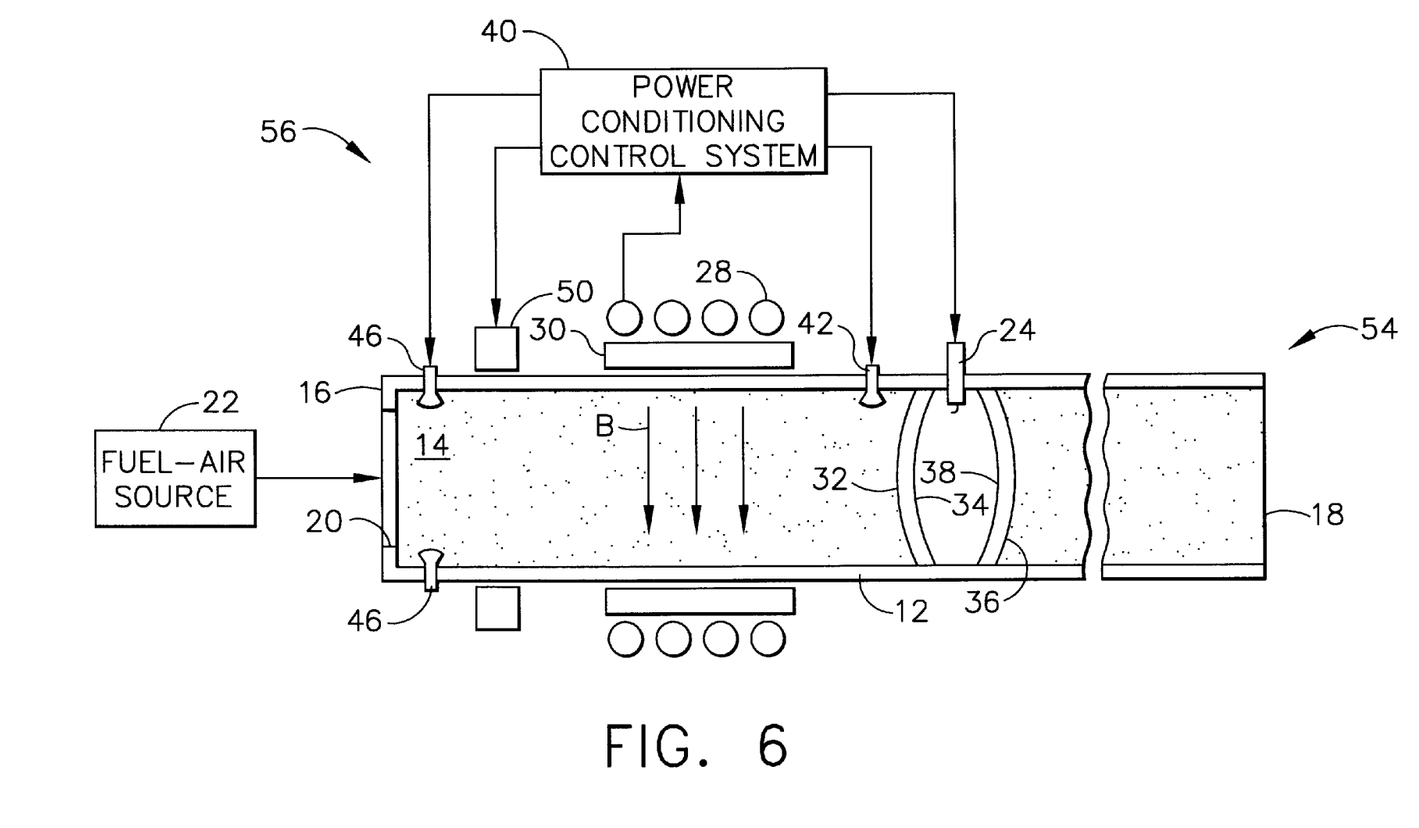
FIGS. 6 and 7 show a schematic cross-section of a pulse detonation engine having a third embodiment of a magnetohydrodynamic flow control system.
Figure 7:
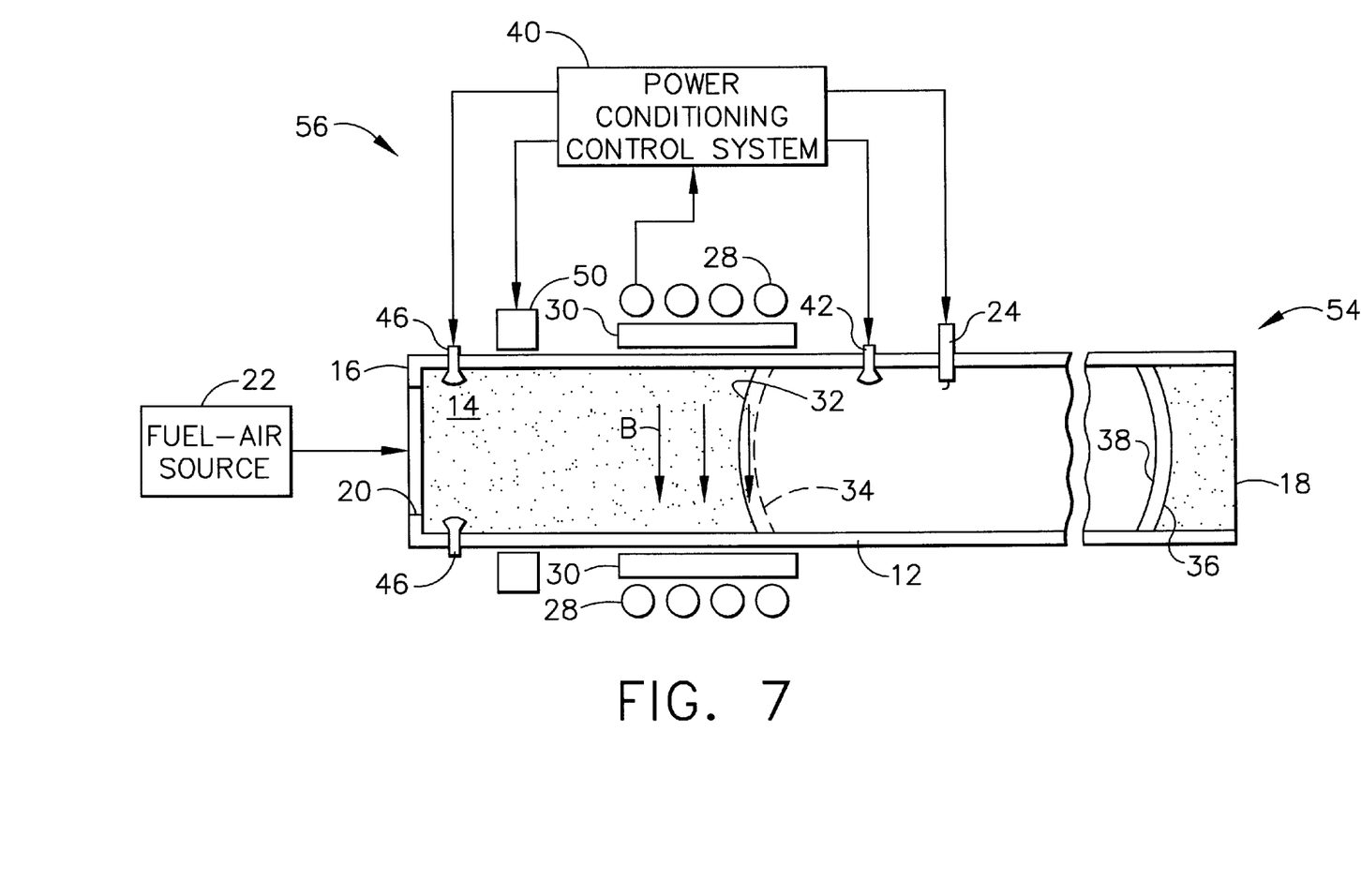

Turning to FIGS. 6 and 7, a third embodiment of a pulsed detonation engine 54 is shown. The pulse detonation engine 54 utilizes a hybrid MHD flow control approach that combines the energy extraction and fuel-air separation techniques of the embodiments discussed above. Specifically, the pulse detonation engine 54 includes a tube 12 having a prescribed length and defining an internal combustion chamber 14. The tube 12 has an open forward end 16 and an open aft end 18. The open forward end 16 functions as a fuel-air inlet 20 to the tube 12, while the open aft end 18 provides an exhaust to the ambient. A fuel-air mixture from a source 22 enters the combustion chamber via the inlet 20. One or more sources of ionization 46 are located in the inlet 20 so that the fuel-air mixture will be ionized upon entering the combustion chamber 14. Again, seeding the fuel-air mixture with a suitable catalyst can enhance ionization of the fuel-air mixture.

An igniter 24 is provided in the tube 12 at a location intermediate the forward and aft ends 16, 18, and preferably closer to the forward end 16 than the aft end 18. The igniter 24 produces sufficient energy to detonate the fuel-air mixture in the combustion chamber 14. The region of the combustion chamber 14 in the immediate vicinity of the igniter 24 is referred to herein as the detonation zone. Detonation combustion depends on the pressure, temperature and equivalence ratio of the fuel-air mixture, as well as the amount of energy released to start ignition. By locating the detonation zone closer to the forward end 16, a larger portion of the tube length is devoted to generating thrust. The overall length of the tube 12 will depend on the desired operating frequency of the pulse detonation engine 54.

An MHD flow control system 56 is located between the detonation zone and the fuel-air inlet 20 for controlling the detonation process in the forward portion of the tube 12. The MHD flow control system 56 comprises a passive electric field coil 28 wrapped around the exterior of the tube 12 at an axial location that is between the igniter 24 and the fuel-air inlet 20. A pair of electrodes disposed on opposite sides of the tube 12 could be used as an alternative to the coil 28, as discussed above in connection with FIG. 3. An active magnetic field coil 50 is also wrapped around the exterior of the tube 12 at an axial location just forward of the electric field coil 28 and aft of the fuel-air inlet 20. A pair of magnets 30 are arranged in proximity to the electric field coil 28 and on opposite sides of the tube 12 so that a magnetic field is created in the tube 12 in a direction perpendicular to the longitudinal axis of the tube 12, as indicated by the arrows B. The magnets can be either permanent magnets or electromagnets.

The MHD flow control system 56 includes a supplemental ionization source 42 for boosting and/or maintaining the ionization of the post combustion products passing through the magnetic field. While the combustion process produces ionized combustion products, the charged particles tend to recombine quickly such that the combustion products lose their ionization. The ionization source 42 is thus provided to boost ionization and maintain the electron density of the combustion products passing through the magnetic field. The ionization source 42 is preferably located at the aft end of the electric field coil 28, although it could also be located along the length of the coil 28.

Ionized, electrically conductive material passing perpendicularly through the magnetic field created by the magnets 30 will result in an electrical current being generated in the electric field coil 28 by electromagnetic induction. As shown in FIGS. 6 and 7, the electric field coil 28 is connected to a power conditioning control system 40 that is provided for directing the electrical power at the appropriate times to the igniter 24 so that the electric power generated by the electric field coil 28 can be used to charge the igniter 24. In addition, the electricity could be used for other purposes, such as powering the ionization sources 46, the supplemental ionization source 42 or onboard devices in a vehicle being propelled by the pulse detonation engine 10.

The power conditioning control system 40 also functions as a real time controller that selectively engages an energy source (not shown) such that an electric current flows through the magnetic field coil 50. When the power conditioning control system 40 causes an electric current to flow though the coil 50, a magnetic field is created in the portion of the tube 12 enclosed by the coil 50. Due to the ionization of the fuel-air mixture, the charged fuel particles would be directionally influenced by the coil 50 when it is energized. Thus, activation of the magnetic field coil 50 would tend to separate the fuel-air mixture in the portion of the combustor chamber 14 encircled by the coil 50. As shown in FIGS. 6 and 7, this would result in a rich fuel zone in the center of the combustion chamber 14 surrounded by a lean air zone. The power conditioning control system 40 also controls the ionization sources 46 and the supplemental ionization source 42.

Operation of the pulse detonation engine 54 begins by filling the combustion chamber 14 with a charge of the fuel-air mixture introduced through the inlet 20. As mentioned above, the ionization sources 46 ionize the fuel-air mixture as it enters the combustion chamber 14. The magnetic field coil 50 is not activated while the combustion chamber 14 is being filled to ensure that the fuel-air mixture remains properly mixed throughout the combustion chamber 14. The power conditioning control system 40 then activates the igniter 24 to detonate the fuel-air mixture. At the same time, the power conditioning control system 40 activates the magnetic field coil 50 causing the fuel-air mixture in the region of the combustion chamber 14 that is encircled by the coil 50 to become separated.

Upon detonation of the fuel-air mixture, as shown in FIG. 6, forward and aft detonation wave groups will be generated. The forward detonation wave group comprises a forward pressure wave 32 and a forward flame front 34, and the aft detonation wave group comprises an aft pressure wave 36 and an aft flame front 38. The forward wave group 32, 34 travels forward in the tube 12 to the MHD flow control system 56. As the electrically conductive flow of the forward wave group 32, 34 passes perpendicularly through the magnetic field created by the magnets 30, an electrical current is generated in the electric field coil 28 by electromagnetic induction. The energy extracted from the forward wave group 32, 34 at least partially dissipates the forward flame front 34, as shown in FIG. 7. As the dissipated forward wave group 32, 34 continues forward, it encounters the separated fuel and air zones. The fuel and air separation starves the combustion process forward of the detonation zone, thereby completely dissipating the forward flame front 34. Thus, the MHD flow control system 56 controls the forward detonation process by extracting power from the forward wave group 32, 34 and then quenching the forward flame front 34. This prohibits the forward flame front 34 from migrating to the fuel-air source 22. Once the forward flame front 34 is dissipated, the coil 50 is deactivated.

Meanwhile, the aft wave group 36, 38 travels downstream from the detonation zone through the generally longer aft portion of the tube 12, consuming the fuel-air mixture along the way. As the aft pressure wave 36, which is a compression wave, accelerates through the combustion chamber 14, it raises both temperature and pressure. When the aft wave group 36, 38 reaches the aft end 18 of the tube 12, the hot, high pressure combustion products are expelled out of the open aft end, creating a pulse of forward thrust. The aft pressure wave 36 is reflected at the aft end 18 as an expansion wave that propagates forward back through the tube 12. The expansion wave lowers pressure in the combustion chamber 14 so that a fresh charge of fuel-air mixture from the inlet 20 is drawn into the combustion chamber 14, thereby readying the pulse detonation engine 54 for the next cycle. The controller 52 is set up to fire the igniter 24 and activate the magnetic field coil 50 at the desired frequency, which is coordinated with the timing of the pressure wave reflections.

The foregoing has described various MHD flow control systems for pulse detonation engines. The flow control systems do not require moving parts and are thus highly reliable and capable of operating at extremely high frequencies. They are also easily controlled by electronic means. While specific embodiments of the present invention have been described, it will be apparent to those skilled in the art that various modifications thereto can be made without departing from the spirit and scope of the invention as defined in the appended claims.

What is claimed is:

1. A pulse detonation engine comprising:
    a tube having an open forward end and an open aft end;
    an igniter disposed in said tube at a location intermediate said forward end and said aft end;
    a fuel-air inlet formed in said tube at said forward end; and
    a magnetohydrodynamic flow control system located between said igniter and said fuel-air inlet for controlling detonation in said tube forward of said igniter.

2. The pulse detonation engine of claim 1 wherein said igniter is located closer to said forward end than said aft end.

3. The pulse detonation engine of claim 1 wherein said magnetohydrodynamic flow control system includes an electric field coil wrapped around said tube at a location between said igniter and said fuel-air inlet and a means for creating a magnetic field in said tube, whereby detonation of a fuel-air mixture in said tube will cause ionized combustion products to flow through said magnetic field and generate an electric current in said electric field coil.

4. The pulse detonation engine of claim 3 wherein said means for creating a magnetic field is a pair of permanent magnets located on opposite sides of said tube.

5. The pulse detonation engine of claim 3 further comprising means for directing said electric current to said igniter.

6. The pulse detonation engine of claim 3 further comprising means for supplementing ionization of combustion products forward of said igniter.

7. The pulse detonation engine of claim 1 wherein said magnetohydrodynamic flow control system includes a pair of electrodes disposed on opposite sides of said tube at a location between said igniter and said fuel-air inlet and a means for creating a magnetic field in said tube, whereby detonation of a fuel-air mixture in said tube will cause ionized combustion products to flow through said magnetic field and generate an electric current between said electrodes.

8. The pulse detonation engine of claim 7 wherein said means for creating a magnetic field is a pair of permanent magnets located on opposite sides of said tube and perpendicular to said electrodes.

9. The pulse detonation engine of claim 7 further comprising means for directing said electric current to said igniter.

10. The pulse detonation engine of claim 7 further comprising means for supplementing ionization of combustion products forward of said igniter.

11. The pulse detonation engine of claim 1 further comprising means for ionizing fuel-air mixture entering said tube via said fuel-air inlet and wherein said magnetohydrodynamic flow control system includes a magnetic field coil wrapped around said tube at a location between said igniter and said fuel-air inlet.

12. The pulse detonation engine of claim 11 further comprising a controller for causing an electric current to flow though said magnetic field coil so that a magnetic field is created in said tube that causes a separation of said fuel-air mixture.

13. The pulse detonation engine of claim 12 wherein said magnetohydrodynamic flow control system further includes an electric field coil wrapped around said tube at a location between said igniter and said fuel-air inlet and a means for creating another magnetic field in said tube in proximity to said electric field coil.

14. The pulse detonation engine of claim 12 wherein said magnetohydrodynamic flow control system further includes a pair of electrodes disposed on opposite sides of said tube at a location between said igniter and said fuel-air inlet and a means for creating another magnetic field in said tube in proximity to said electrodes.

15. A pulse detonation engine comprising:
a tube having an open forward end and an open aft end;
a fuel-air inlet formed in said tube at said forward end for introducing a fuel-air mixture into said tube;
an igniter disposed in said tube at a location intermediate said forward end and said aft end for detonating said fuel-air mixture in said tube so as to generate a forward detonation wave group comprising a forward pressure wave and a forward flame front and an aft detonation wave group comprising an aft pressure wave and an aft flame front; and a magnetohydrodynamic flow control system located between said igniter and said fuel-air inlet for dissipating said forward flame front.

16. The pulse detonation engine of claim 15 wherein said igniter is located closer to said forward end than said aft end.

17. The pulse detonation engine of claim 15 wherein said magnetohydrodynamic flow control system includes an electric field coil wrapped around said tube at a location between said igniter and said fuel-air inlet and a means for creating a magnetic field in said tube, whereby detonation of said fuel-air mixture in said tube will cause ionized combustion products to flow through said magnetic field and generate an electric current in said electric field coil so that said forward flame front is dissipated.

18. The pulse detonation engine of claim 17 wherein said means for creating a magnetic field is a pair of permanent magnets located on opposite sides of said tube.

19. The pulse detonation engine of claim 17 further comprising means for directing said electric current to said igniter.

20. The pulse detonation engine of claim 17 further comprising means for supplementing ionization of combustion products forward of said igniter.

21. The pulse detonation engine of claim 15 wherein said magnetohydrodynamic flow control system includes a pair of electrodes disposed on opposite sides of said tube at a location between said igniter and said fuel-air inlet and a means for creating a magnetic field in said tube, whereby detonation of said fuel-air mixture in said tube will cause ionized combustion products to flow through said magnetic field and generate an electric current between said electrodes so that said forward flame front is dissipated.

22. The pulse detonation engine of claim 21 wherein said means for creating a magnetic field is a pair of permanent magnets located on opposite sides of said tube and perpendicular to said electrodes.

23. The pulse detonation engine of claim 21 further comprising means for directing said electric current to said igniter.

24. The pulse detonation engine of claim 21 further comprising means for supplementing ionization of combustion products forward of said igniter.

25. The pulse detonation engine of claim 15 further comprising means for ionizing fuel-air mixture entering said tube via said fuel-air inlet and wherein said magnetohydrodynamic flow control system includes a magnetic field coil wrapped around said tube at a location between said igniter and said fuel-air inlet.

26. The pulse detonation engine of claim 25 further comprising a controller for causing an electric current to flow though said magnetic field coil so that a magnetic field is created in said tube that causes a separation of said fuel-air mixture that dissipates said forward flame front.

27. The pulse detonation engine of claim 26 wherein said magnetohydrodynamic flow control system further includes an electric field coil wrapped around said tube at a location between said igniter and said fuel-air inlet and a means for creating another magnetic field in said tube in proximity to said electric field coil.

28. The pulse detonation engine of claim 26 wherein said magnetohydrodynamic flow control system further includes a pair of electrodes disposed on opposite sides of said tube at a location between said igniter and said fuel-air inlet and a means for creating another magnetic field in said tube in proximity to said electrodes.

* * * * *